United States Patent
Muhlestein

(10) Patent No.: US 10,291,675 B2
(45) Date of Patent: *May 14, 2019

(54) METHODS AND APPARATUS FOR PROACTIVE MULTI-PATH ROUTING

(71) Applicant: DISH Technologies L.L.C., Englewood, CO (US)

(72) Inventor: Herrick Muhlestein, Englewood, CO (US)

(73) Assignee: DISH TECHNOLOGIES LLC, Englewood, CO (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/127,744

(22) Filed: Sep. 11, 2018

(65) Prior Publication Data

US 2019/0007474 A1 Jan. 3, 2019

Related U.S. Application Data

(63) Continuation of application No. 14/145,115, filed on Dec. 31, 2013, now Pat. No. 10,104,141.

(60) Provisional application No. 61/747,839, filed on Dec. 31, 2012.

(51) Int. Cl.
*G06F 15/16* (2006.01)
*H04L 29/06* (2006.01)
*H04L 12/26* (2006.01)

(52) U.S. Cl.
CPC .......... *H04L 65/60* (2013.01); *H04L 43/0835* (2013.01); *H04L 65/4084* (2013.01); *H04L 65/4092* (2013.01); *H04L 65/80* (2013.01)

(58) Field of Classification Search
None
See application file for complete search history.

(56) References Cited

U.S. PATENT DOCUMENTS

| 8,154,988 B2* | 4/2012 | Pickens | H04N 21/222 370/216 |
| 9,401,813 B2* | 7/2016 | Viers | H04L 43/50 |
| 2005/0002337 A1* | 1/2005 | Wang | H04L 1/0009 370/235 |

* cited by examiner

*Primary Examiner* — Mohamed Ibrahim
(74) *Attorney, Agent, or Firm* — Lorenz & Kopf LLP

(57) ABSTRACT

Methods, systems, and devices are described to proactively adapt media streaming by a number of media player clients over a network. Each media player requests segments of an adaptive media stream for playback. In implementations, some or all of the media players in the system are able to measure packet loss or other indicia of issues with the data transmission. This indicia can be used to adapt subsequent requests for additional segments of the media stream. Moreover, some implementations could provide the measured packet loss or other indicia to the server as feedback. The server, in turn, can use the feedback from the players (along with any other additional information) to formulate business rules subsequently delivered to some or all of the players in the system. The media players can therefore adapt their segment request based upon locally measured data and/or based upon business rules that reflect system-wide conditions.

20 Claims, 2 Drawing Sheets

METHODS AND APPARATUS FOR PROACTIVE MULTI-PATH ROUTING

CROSS-REFERENCE TO RELATED APPLICATIONS

Figure 1:
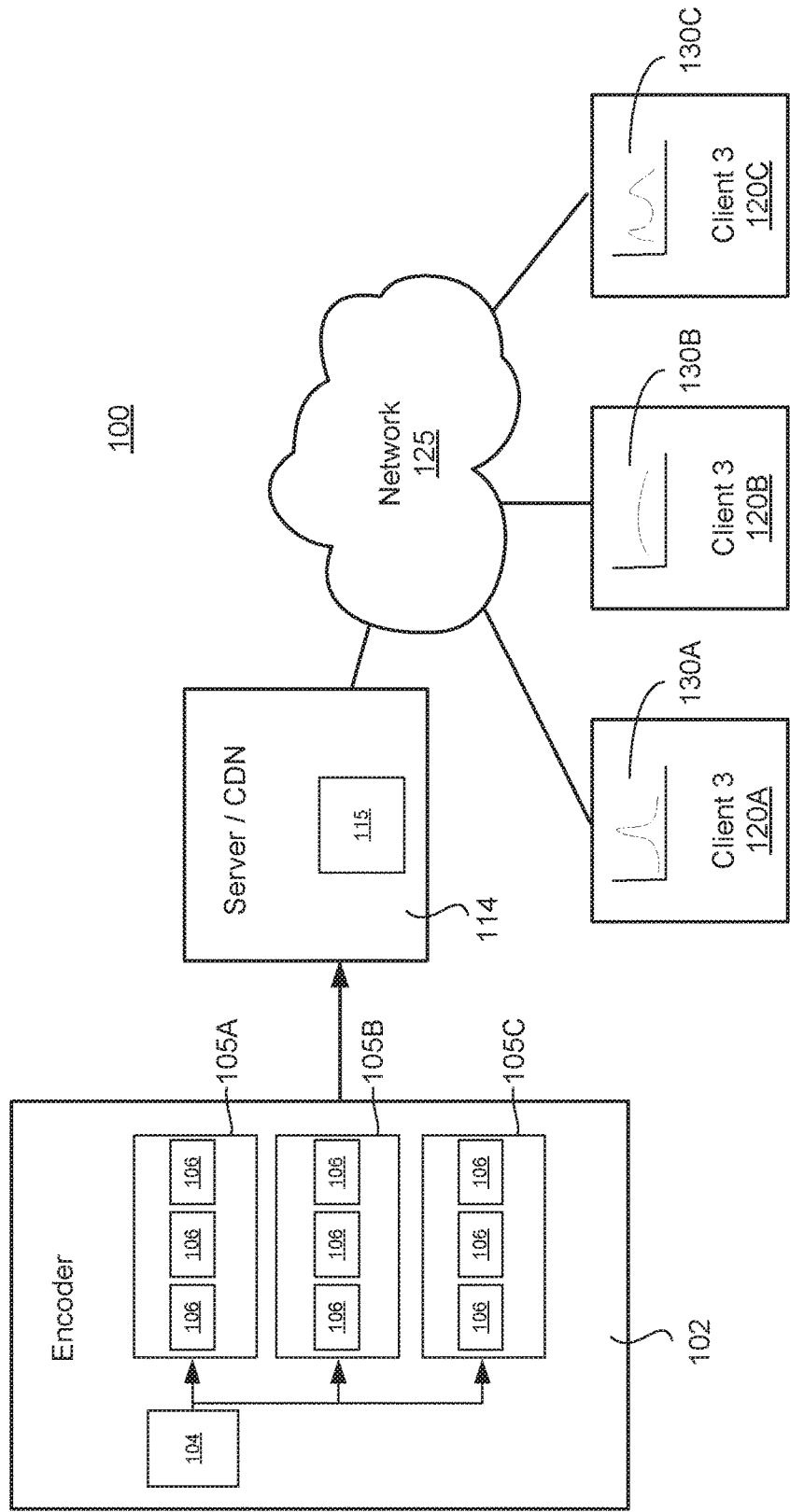

This application claims priority to co-pending U.S. patent application Ser. No. 14/145,115, filed with the United States Patent and Trademark Office (USPTO) on Dec. 31, 2013, which, in turn, claims priority to U.S. Prov. Pat. App. Ser. No. 61/747,839, filed with the USPTO on Dec. 31, 2012.

TECHNICAL FIELD

The present disclosure generally relates to streaming media content over the Internet or another network. More particularly, the following discussion relates to systems, methods, and devices that allow a media player client to proactively adapt media streaming requested by the client.

BACKGROUND

Media streaming is becoming an increasingly popular way of delivering television, movies and other media content to viewers. Media streams are typically point-to-point transmissions of digitized content that can be sent over the Internet or a similar network. Media streaming is often used to facilitate video-on-demand (VOD) services, remote storage digital video recorder (RSDVR) services, Internet Protocol television (IPTV) services, placeshifted media viewing, and/or any number of other convenient services. Generally, the media stream is played back for the viewer in real time as the stream continues to be delivered to the player.

Often, media content is encoded into multiple sets of "streamlets" or other smaller segment files that can be individually requested and adaptively delivered to a particular client device. As changes in network bandwidth or other factors occur, the client device is able to react to the changes by requesting future segments that are encoded with different parameters (e.g., a higher or lower bit rate). Several examples of adaptive streaming systems, devices and techniques are described in U.S. Patent Publication No. 2008/0195743, which is incorporated herein by reference.

Adaptive media streaming typically relies upon the media player client to control much of the streaming process. That is, the media player client, rather than the server, typically determines the next segment of the stream that will be requested and delivered to the player. While this player-centric approach provides adaptability to the particular conditions experienced by the player, the client is often limited in that it only has a limited amount of information that can be used to determine which segment should be requested next. If network congestion, server overload, or other system-wide issues are occurring, the client device itself is typically not aware of these issues until they directly impact the stream of segments provided to that particular client device.

It is therefore desirable to create systems, devices, and methods that allow the client device to better control the adaptive streaming process and/or to respond to issues that may be beyond the immediate visibility of the client device. These and other desirable features and characteristics will become apparent from the subsequent detailed description and the appended claims, taken in conjunction with the accompanying drawings and this background section.

BRIEF SUMMARY

Several examples of methods, systems, and devices to proactively adapt media streaming by a number of media player clients over the Internet or another data network are described. Each media player device operating in the system requests segments of adaptive media streams for playback to a viewer. In some implementations, some or all of the media players in the system are able to measure packet loss or other indicia of issues with the data transmission. This indicia can be used to adapt subsequent requests for additional segments of the media stream. Moreover, some implementations could provide the measured packet loss or other indicia back to the server as feedback. The server, in turn, can use the feedback from the players (along with any other additional information) to formulate business rules that can be subsequently delivered to some or all of the players in the system. The media players can therefore proactively adapt their segment request based upon locally measured data and/or based upon business rules that reflect system-wide conditions.

Alternate embodiments, aspects and other features are described in more detail herein.

BRIEF DESCRIPTION OF THE DRAWING FIGURES

Figure 2:
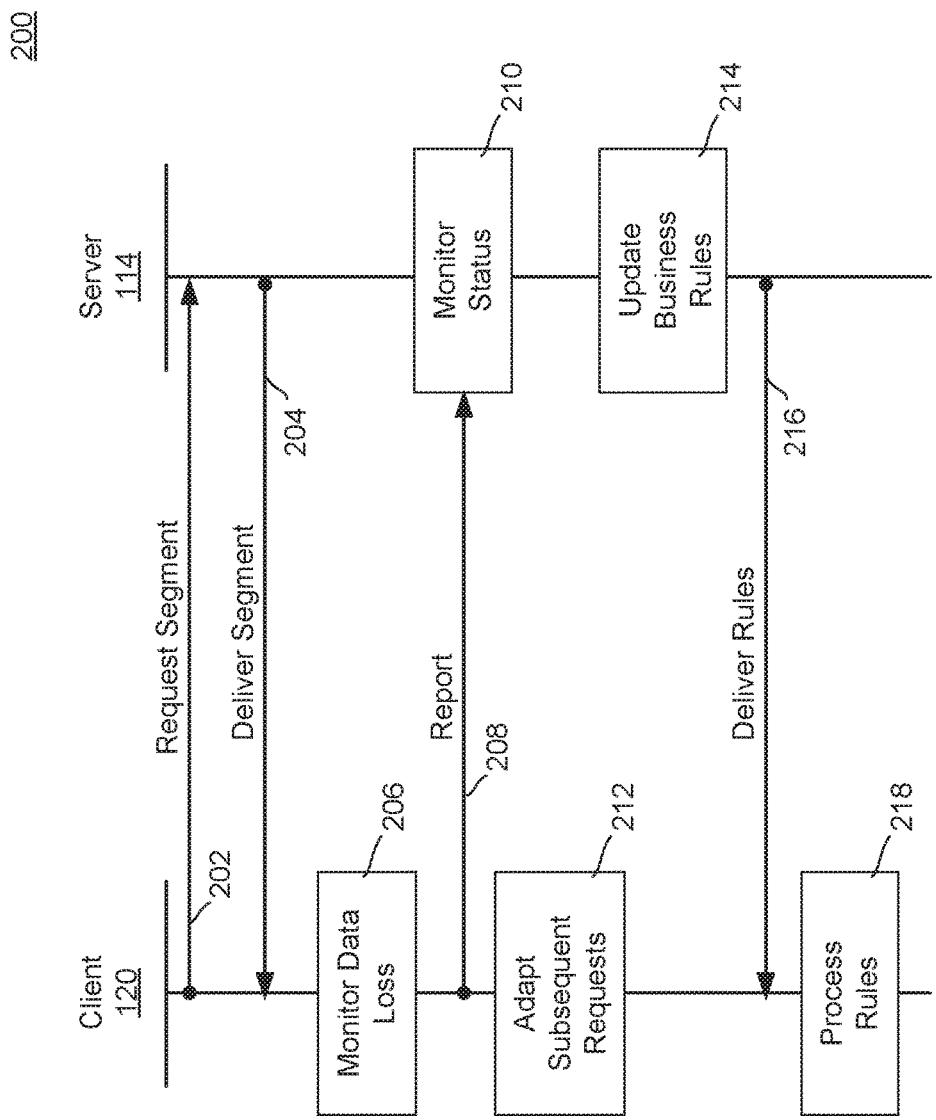

Exemplary embodiments will hereinafter be described in conjunction with the following drawing figures, wherein like numerals denote like elements, and:

FIG. 1 is a block diagram of an exemplary system for providing adaptive media streams in a data network; and FIG. 2 is a flowchart of an exemplary process that can provide proactive streaming.

DETAILED DESCRIPTION

The following detailed description of the invention is merely exemplary in nature and is not intended to limit the invention or the application and uses of the invention. Furthermore, there is no intention to be bound by any theory presented in the preceding background or the following detailed description.

As described above, it can be relatively difficult for a media player client device to measure network performance during a media streaming session. Typically, the media player has little, if any, exposure to a broader media streaming system. It can therefore be relatively difficult to adapt the media player to react to changing conditions until such conditions adversely impact the experience for the user. Methods, systems, and devices are therefore provided to allow media player clients operating within a system to proactively respond to network congestion, server overload and/or other issues that may arise before the issue becomes severe or disabling. Even if the media player is currently experiencing good network delivery, it may scale back its requests for resources if it becomes aware that other parts of the system are experiencing delays, dropped packets, or other issues. The media player is therefore able to proactively adapt its behavior for the good of the system even if its own local conditions would not otherwise dictate such behavior.

Turning now to the drawing figures and with initial reference to FIG. 1, an exemplary system 100 to adaptively deliver media streams to client devices 120A-C over a network 125 suitably includes an encoder 102 and a media server 114. The various components shown in FIG. 1 may be jointly provided by a common service provider, or different service providers may work together to provide different components of the system 100. A television network or other content provider might provide content that is already encoded in the appropriate formats, for example, thereby obviating the need for a separate encoder 102 in some implementations. Similarly, unicast and/or multicast hosting could be performed by any sort of content delivery network (CDN) or other service 114, as appropriate.

Encoder 102 is any device or service capable of encoding media programs 104 into one or more adaptive streams 105A-C. In the exemplary embodiment shown in FIG. 1, encoder 102 is a digital computer system that is programmed to create multiple streams 105A-C, each representing the same media program 104 in its entirety. Typically, each stream 105A-C is made up of smaller segments 106 that represent a small portion of the program in a "streamlet" or other single data file. Each stream 105A-C is typically encoded so that segments 106 of the different streams 105A-C are interchangeable with each other. That is, a client media player 120A-C can mix and match segments 106 from different streams 105A-C to continue seamless playback even as network conditions or other resources change.

Generally, the sets of segments 106 making up each stream 105 are stored on a CDN or other server 114 for distribution on the Internet or another network 125. Typically, a media player application executing on one or more client devices 120A-C contains intelligent logic to select appropriate segments 106 as needed to obtain and playback the media program 104. As noted above, segments 106 may be interchangeable between streams 105 so that higher bandwidth segments 106 may be seamlessly intermixed with lower bandwidth segments 106 to reflect changing network or other conditions in delivery over network 125. In some implementations, the media player 120 initially obtains a digest or other description of the available segments so that the player itself can request the segments 106 as needed. Often, such requests can be processed using conventional hypertext transport protocol (HTTP) constructs that are readily routable on network 125 and that can be served by conventional CDN or other web-type servers 110. Although FIG. 1 shows only a single server 114, many implementations could spread streams 105 and/or segments 106 across any number of servers 114 for convenient delivery to clients 120A-C located throughout network 125.

In various embodiments, the server 114 collects feedback data about network conditions experienced by one or more client devices 120A-C and uses the feedback data to formulate business rules 115 that can be distributed to clients 120A-C to direct future segment requests. The various business rules 115 may direct clients to avoid certain servers and/or certain data streams 105A-C in subsequent requests, for example, or to take other actions as appropriate. The business rules 115 may be tailored to individual client devices 120A-C (or at least groups of devices) in some implementations, while other implementations could use a common set of business rules for all of the clients 120A-C.

Each client device 120A-C is any sort of media player client capable of receiving streaming media content via network 125. In various embodiments, client devices 120A-C could be mobile phones or other portable devices, computer systems executing media player applications, tablet or notebook computers, video game players, media players, television receivers, video recorders and/or any number of other consumer-controlled devices. As stated above, each media player 120A-C typically executes its own media player software that is able to adaptively request segments 106 belonging to any of the different streams 105A-C associated with a program 104 that is being presented to the viewer. By requesting segments 106 that were encoded using different parameters, the media stream being provided to the media client 130 can be adjusted "on the fly". As conditions dictate, each media player 130A-C is able to reduce demands on system resources by requesting lower bandwidth segments 106, by redirecting segment requests to different servers 114 or CDNs, or by taking other actions as appropriate.

Media player clients 120A-C may estimate their local network performance in any manner. In various embodiments, the client 120A-C monitors packets that are dropped (e.g., by tallying retransmit requests), or other parameters as desired. In some implementations, the client device 120A-C suitably monitors variance in the amount of data received during several time intervals. The client may measure data amounts received during an interval spanning 10 to 50 microseconds or so, for example, to determine variance in the received data rate, although other embodiments may consider other intervals that are longer or shorter. If the data loss rate is relatively low, then the amount of data delivery will be relatively consistent across each time interval. That is, roughly the same amount of data should arrive during each time interval. As data loss occurs, however, each client device 120A-C will experience variation in the amounts of data received from interval to interval. By tracking the amounts of data received over various time intervals, then, variance and inconsistency can be identified and correlated to packet loss in the data connection. FIG. 1 shows this data 130A-C in histogram-type graphical format for ease of understanding. In practice, the data may be kept in numerical form in an array or other suitable data structure using conventional data processing techniques. Again, packet loss or other network indicia may be monitored by any number of network clients 120A-C using any techniques in addition to or in place of those described herein.

Turning now to FIG. 2 in conjunction with FIG. 1, an exemplary process 200 for delivering media streams 105A-C to media client devices 120A-C suitably includes various functions 202-218 that can be carried out by the media player client 120, by the server 114, and/or another processing device as appropriate. The various functions shown in FIG. 2 are generally implemented using software instructions that are stored in memory or other non-transitory storage and that are executed by processors at client 120 and/or server 114, as appropriate. Although FIG. 2 shows a single client device 120, in practice the various functions shown for device 120 would typically be replicated and simultaneously performed by numerous clients 120A-C operating within system 100.

As described above, client device 120 requests media segments 106 from server 114 (function 202) using HTTP or other conventional mechanisms. Server 114 responsively provides the requested segments 106 (function 204), again using conventional media delivery mechanisms such as HTTP delivery over TCP.

The client device 120 monitors network performance in any suitable manner (function 206). In some embodiments, client 120 detects dropped packets by tracking retransmit requests, by monitoring variations in the data delivery rate, or by any other techniques. Some embodiments additionally or alternatively track latency (e.g., delay in data delivery), as desired. The performance data can be reported back to server 114 as feedback (function 208) as desired. Feedback can be reported on a regular or irregular temporal basis, in response to polling from the server 114 itself, in response to particularly interesting results (e.g., in response to particularly bad performance observed by the client 120), and/or in any other manner.

Client 120 may adapt its own behavior in response to its observed network conditions (function 212). If data errors, latency and/or other issues are observed, the client 120 may respond by requesting lower bandwidth segments 106, for example, by requesting segments 106 from an alternate server 114, by using an alternate signal path (e.g., switching between a data network and a telephone network, or a broadcast television signal), and/or in any other manner. In various embodiments, client 120 simply requests lower bandwidth segments (e.g., segments encoded with lower bit rates, frame rates, resolution and/or other parameters) when network congestion, packet loss, latency or other adverse conditions occur. The client is therefore able to respond to its own observed network conditions and to take corrective action as appropriate.

In various embodiments, the client 120 may also take corrective action in response to real or perceived issues affecting other parts of system 100 even though the local conditions observed by client 120 may not be affected. In such embodiments, server 114 suitably receives feedback reports 208 from the various clients 120 operating in system 100 (function 210), and formulates new business rules 115 based upon the particular conditions observed (function 214). The business rules 115 direct some or all of the clients 120A-C operating in system 100 to request lower bandwidth segments 106, to avoid certain servers 114 or data streams 105, or to take other actions as desired.

Rules 115 may be created for certain clients 120A-C or groups of clients 120A-C based upon the network locations of the clients, the types of client devices (e.g., mobile phone, computer system, standalone player device), the capabilities of the client device or its serving network, or other factors as appropriate. Other embodiments may create more global rules that are shared with larger groups of clients 120, or all of the clients 120, as desired. In some embodiments, server 114 injects randomness into the business rules 115 so that certain randomly-assigned clients 120 are directed to scale-back or to take other actions. If it is desired to reduce loading on a particular server, for example, a certain percentage of clients 120 that are currently using the server could be redirected to another server, directed to withhold requests for a period of time, directed to request lower bandwidth segments 106, or directed to take other actions as desired. The decisions about whether to create or adjust business rules may be made in any manner. Various embodiments will adjust rules based upon comparisons of reported network behaviors from one or more clients 120 with threshold values or the like. As the average delay or the average packet loss rate observed by one or more clients 120 exceeds a threshold, for example, a rule can be created that directs clients using similar resources to scale back. The particular threshold values may be obtained through experiments, trial-and-error, or other techniques as desired.

The various business rules 115 are shared with the media player devices 120 (function 216) using any sort of in-band, out-of-band, or other signaling techniques. Each client 120 is therefore able to implement the various business rules (function 218) and thereby proactively take actions for the overall good of system 100 that may not have been otherwise detectable using direct techniques. Business rules 115 can also be used to manage expenses, or other factors. Clients 120 can be directed to avoid an expensive CDN service, for example, unless system loads leave few other options. Other factors could be similarly considered.

Even though the client 120 maintains its autonomy to request particular segments 106 of media streams 105A-C, the client requests can be adjusted from a server 114 or other central location through the use of business rules 115. By proactively adjusting client behaviors in this manner, more catastrophic events can often be avoided. Server overloads, for example, might be redistributed before the server is stressed to the point of failure or non-responsiveness. Congested network paths can be similarly managed to allow continued traffic flow without overloading any particular connection. This can provide further benefits in avoiding harmonic oscillations as client devices cycle between "good" performance states and "bad" performance states in response to perceived issues. Rather than simply responding to major events, then, the client can adaptively and proactively adjust its behavior for the collective benefit of system 100.

Note that FIGS. 1 and 2 show server 114 as providing segment delivery, feedback collection, business rule generation, and rule distribution functions. In practice, some or all of these functions could be distributed between multiple computer systems that all respond to client 120 via network 125. Other enhancements (such as the ability to implement server 114 using a cloud service or the like) could also be provided. The various systems, structures and processes shown in the figures could be augmented or modified in any number of alternate but equivalent embodiments.

The term "exemplary" is used herein to represent one example, instance or illustration that may have any number of alternates. Any implementation described herein as exemplary is not necessarily to be construed as preferred or advantageous over other implementations. While several exemplary embodiments have been presented in the foregoing detailed description, it should be appreciated that a vast number of alternate but equivalent variations exist, and the examples presented herein are not intended to limit the scope, applicability, or configuration of the invention in any way. To the contrary, various changes may be made in the function and arrangement of elements described without departing from the scope of the claims and their legal equivalents.

What is presently claimed is:

1. A method executable by a first media player device to proactively request segments of a first media stream from a server over a network, the method comprising:
   placing requests from the first media player device for segments of the first media stream to be delivered to the first media device via the network by the server;
   measuring, at the first media player device, a local error rate of data received from the server by the first media player device over the network;
   reporting the local error rate measured by the first media player device to the server;
   in response to reporting the local error rate to the server, receiving business rules from the server formulated utilizing the local error rate and a plurality of other error rates reported by additional media player devices communicating with the server via the network; and
   proactively adapting subsequent requests placed by the first media player device for segments of the first media stream based upon the local error rate and the business rules, the business rules instructing the first media player device to avoid a congested network path in placing additional requests for segments of the media stream even when the local error rate measured by the first media player device is low.

2. The method of claim 1 wherein the business rules instruct the first media player device to increase a likelihood of requesting lower bandwidth segments of the first media stream from the server, even when the local error rate measured by the first media player device is low, if the plurality of other error rates reported by the additional media player devices are undesirably high.

3. The method of claim 1 wherein the business rules further instruct the first media player device to request lower bandwidth segments of the first media stream when at least some of the plurality of other error rates reported by the additional media player devices exceed a threshold value.

4. The method of claim 1 wherein the business rules further instruct the first media player device to withhold requests from the server for additional segments of the first media stream for a specified period of time.

5. The method of claim 1 wherein measuring comprises tracking, at the first media player device, a variance in an amount of data received by the first media player device in response to the requests.

6. The method of claim 1 wherein measuring comprises monitoring, at the first media player device, a rate of packet loss by tracking retransmit requests sent from the first media player device to the server.

7. A method executable by a first media player device to proactively request segments of a first media stream from a server over a network, the method comprising:
   placing requests from the first media player device for segments of the first media stream to be delivered to the first media device via the network by the server;
   measuring, at the first media player device, a local error rate of data received from the server by the first media player device over the network;
   reporting the local error rate measured by the first media player device to the server;
   in response to reporting the local error rate to the server, receiving business rules from the server formulated utilizing the local error rate and a plurality of other error rates reported by additional media player devices communicating with the server via the network; and
   proactively adapting subsequent requests placed by the first media player device for segments of the first media stream based upon the local error rate and the business rules, the business rules instructing the first media player device to withhold requests from the server for additional segments of the first media stream for a specified period of time even when the local error rate measured by the first media player device is low.

8. The method of claim 7 wherein the business rules instruct the first media player device to increase a likelihood of requesting lower bandwidth segments of the first media stream from the server, even when the local error rate measured by the first media player device is low, if the plurality of other error rates reported by the additional media player devices are undesirably high.

9. The method of claim 7 wherein the business rules further instruct the first media player device to request lower bandwidth segments of the first media stream from the server when at least some of the plurality of other error rates reported by the additional media player devices exceed a threshold value.

10. The method of claim 7 wherein the business rules further instruct the first media player device to avoid a congested network path in placing additional requests for segments of the media stream.

11. The method of claim 7 wherein the measuring comprises tracking, at the first media player device, a variance in an amount of data received in response to the requests.

12. The method of claim 7 wherein measuring comprises monitoring, at the first media player device, a rate of packet loss by tracking retransmit requests sent from the first media player device to the server.

13. A method executable by a server to generate and distribute business rules to a plurality of media player devices in communication with the server over a network, the method comprising:
   receiving, at the server, requests from at least a first media player device included in the plurality of media player devices for segments of a first media stream delivered to the first media player device via the network by the server;
   further receiving, at the server, reports from at least some of the plurality of media player devices, the reports indicating error rates of data transmissions received at the plurality of media player devices;
   formulating, at the server, a set of business rules based at least in part on the error rates reported by at least some of the plurality of media player devices; and
   after formulating the set of business rules, transmitting the set of business rules from the server, over the network, and to the plurality of media player devices;
   wherein the set of business rules instructs at least the first media player device to proactively adapt subsequent requests for segments of the first media streams from the server.

14. The method of claim 13 wherein the business rules further instruct at least the first media player device to increase a likelihood of requesting lower bandwidth segments of the first media stream from the server, even when a local error rate measured by the first media player device is low, if other error rates reported by the plurality of media player devices are undesirably high.

15. The method of claim 13 wherein the business rules further instruct at least the first media player device to request lower bandwidth segments of the first media stream from the server when at least some of the error rates reported by the plurality of media players devices exceed a predetermined threshold.

16. The method of claim 13 wherein the business rules further instruct at least the first media player device to avoid a congested network path in placing additional requests for segments of the first media stream.

17. The method of claim 13 wherein the business rules further instruct at least the first media player device to withhold requests from the server for additional segments of the first media stream for a specified period of time.

18. The method of claim 13 further comprising, at the server, utilizing randomness to distribute client behavior of the plurality of media player devices when formulating the set of business rules.

19. The method of claim 13 further comprising generating, at the server, the business rules to instruct a percentage of the plurality of media player devices to withhold requests for additional media stream segments a specified period of time.

20. The method of claim 13 wherein the set of business rules instructs at least the first media player device to proactively adapt subsequent requests for segments of the first media streams from the server even when a local error rate measured by the first media player device is low.

* * * * *